3,030,181
CRYSTALLINE ZEOLITE R
Robert M. Milton, Buffalo, N.Y., assignor to Union Carbide Corporation, a corporation of New York
No Drawing. Filed Aug. 26, 1957, Ser. No. 680,381
18 Claims. (Cl. 23—113)

This invention relates to a synthetic, crystalline, metal aluminosilicate of the zeolite type, its derivatives, and to a method of making this aluminosilicate.

Certain adsorbents selectively sorb molecules on the basis of the size and shape of the adsorbate molecule, and are called "molecular sieves." Molecular sieves are crystalline metal aluminosilicates of the zeolite type which have a sorption area available on the inside of a large number of uniformly sized pores of molecular dimensions. With such an arrangement, molecules of a certain size and shape enter the pores and are adsorbed, while larger or differently-shaped molecules are excluded. Not all adsorbents behave in the manner of molecular sieves. The common adsorbents, charcoal and silica gel, for example, do not exhibit molecular sieve action.

Dehydration of the molecular sieves to effect the loss of the water of hydration results in a crystal interlaced with channels of molecular dimensions that offer very high surface areas for the adsorption of foreign molecules. Factors influencing occlusion by activated molecular sieves are the size and polarizing power of the interstitial cation; the polarizability and polarity of the occluded molecules, the dimensions and shape of the sorbed molecule relative to those of the channels, the duration and severity of dehydration and desorption; and the presence of foreign molecules in the interstitial channels.

It is the principal object of this invention to provide an adsorbent of the molecular sieve type having unique adsorbing properties. A further object is to provide a novel crystalline sodium aluminosilicate suitable for use as an adsorbent. Still another object of the invention is to provide a method of making the novel adsorbent of the invention. Other objects will be apparent from the subsequent disclosure and appended claims. The synthetic zeolitic molecular sieve described herein and its derivatives will be designated hereinafter as "zeolite R" to distinguish it from other zeolites.

The chemical formula for zeolite R may be written as:

$$0.9 \pm 0.2 Na_2O : Al_2O_3 : WSiO_2 : XH_2O$$

wherein "W" is from 3.45 to 3.65, and "X," for the fully hydrated form is about 7.

Zeolite R has an X-ray powder diffraction pattern substantially like that shown in Table I. Peak height and Bragg angle, $2\theta$, were obtained from Geiger counter spectrometer tracings, and the interplanar spacing, $d$, and relative intensities of each line were calculated therefrom.

TABLE I
X-Ray Diffraction Patterns of Synthetic Zeolite R
SODIUM ZEOLITE R

[$d$ = Interplanar Spacing in A.: I/I Max. = Relative Intensity]

| d, A. | 100 (I/I max.) |
|---|---|
| 9.51 | 88 |
| 6.97 | 35 |
| 5.75 | 16 |
| 5.61 | 26 |
| 5.10 | 45 |
| 4.75 | 12 |
| 4.37 | 78 |
| 4.13 | 12 |
| 4.02 | 14 |
| 3.92 | 35 |
| 3.80 | 16 |
| 3.63 | 41 |
| 3.48 | 25 |
| 3.34 | 12 |
| 3.21 | 18 |
| 3.13 | 12 |
| 2.95 | 100 |
| 2.89 | 16 |
| 2.80 | 14 |
| 2.71 | 14 |
| 2.66 | 10 |
| 2.62 | 25 |
| 2.53 | 22 |
| 2.39 | 10 |
| 2.14 | 6 |
| 2.10 | 14 |
| 1.93 | 10 |
| 1.89 | 10 |
| 1.82 | 18 |
| 1.76 | 6 |
| 1.73 | 16 |
| 1.69 | 4 |

Zeolite R may be prepared as follows:

A sodium aluminosilicate-water mixture is prepared such that the initial composition of the reactant mixture, in terms of oxide-mole-ratios, falls within one of the following seven ranges:

| | 1 | 2 | 3 | 4 | 5 | 6 | 7 |
|---|---|---|---|---|---|---|---|
| $Na_2O/SiO_2$ | 0.20 to 0.40 | 0.41 to 0.60 | 0.61 to 0.80 | 0.81 to 1.0 | 0.81 to 1.0 | 1.7 to 1.9 | 1.2 to 1.4 |
| $SiO_2/Al_2O_3$ | about 4 | 3.5 to 6.0 | 3.5 to 6.5 | 3 to 4.5 | about 30 | 10 to 25 | about 6 |
| $H_2O/Na_2O$ | 22 to 60 | 30 to 60 | 40 to 80 | 40 to 80 | 50 to 60 | 60 to 70 | 80 to 90 |

The mixture is maintained at a temperature within the range of about 25° C. to 150° C. until crystals are formed; the crystals are then separated from the mother liquor.

In some cases, impurities are formed together with zeolite R; other zeolite species are included among these impurities. Sodium zeolite R may be separated from these impurities by flotation and similar techniques to obtain a substantially pure product.

The usual method of preparation comprises dissolving sodium aluminate and alkali in water and adding this solution to a water solution of sodium silicate or preferably to a water-silicate mixture derived at least in part from an aqueous colloidal silica sol. The resultant mixture is placed in sealed containers to avoid loss of water and heated at 100° C. to 120° C. until crystallization occurs. When crystalliaztion is complete the solids are separated from the mother liquor by a means such as suction filtration and washed with distilled water until the pH of the effluent is about 10 to 11, indicating that the crystals are free from excess alkali. The product, after drying at 100–110° C., may be identified by chemical analysis and X-ray powder diffraction patterns.

Examples of reagents which may be used in the preparation of synthetic zeolite R are listed in Table II.

TABLE II

*Reagents for the Synthesis of Zeolite R*

| Reagent | Composition, Moles/100 g. | | | |
|---|---|---|---|---|
| | $Na_2O$ | $Al_2O_3$ | $SiO_2$ | $H_2O$ |
| A. Sodium Hydroxide | 1.25 | | | 1.25 |
| B. Sodium Aluminate | 0.48 | 0.43 | | 1.39 |
| C. Sodium Aluminate | 0.48 | 0.44 | | 1.43 |
| D. Aqueous Colloidal Silica Sol | | | 0.49 | 3.92 |
| E. Distilled Water | | | | 5.55 |
| F. Sodium Silicate | 0.318 | | 0.532 | 2.69 |
| G. Sodium Silicate | 0.109 | | 0.422 | 3.76 |

In a typical preparation, 0.88 gram of A, 5.00 grams of C, 17.8 grams of D, and 11.2 grams of water were used to prepare a mixture having an overall composition per mole of $Al_2O_3$ of 1.6 moles $Na_2O$, 4.0 moles $SiO_2$, and 64 moles of $H_2O$. After heating the mixture at 100° C. for 16 hours in a sealed glass container, the supernatant liquid was removed by filtration and the solid residue, white crystals, was washed until free of excess sodium hydroxide. Chemical analysis of these crystals gave the molar composition:

$$0.95Na_2O:Al_2O_3:3.64SiO_2:4.9H_2O$$

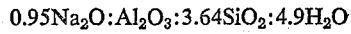

The X-ray powder diffraction pattern was substantially as shown in Table I.

In another example of this invention, 1.59 grams of A, 5.00 grams of C, 17.8 grams of D, and 17.4 grams of water were used to prepare a mixture having an overall composition per mole of $Al_2O_3$ of 2.0 moles $Na_2O$, 4.0 moles $SiO_2$ and 80 moles of $H_2O$. After heating the mixture at 120° C. for 3.5 hours in an autoclave, the supernatant liquid was removed by filtration and the solid residue, white crystals, was washed until free of excess sodium hydroxide. Chemical analysis of the dried crystals gave the molar composition:

$$0.95Na_2O:Al_2O_3:3.61SiO_2:5.4H_2O$$

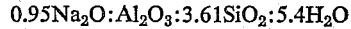

X-ray powder diffraction data showed that the material had a crystal structure substantially the same as that represented by the data of Table I.

Similarly, 0.88 gram of A, 5.00 grams of C, and 17.8 grams of D were used to prepare a mixture having an overall composition per mole of $Al_2O_3$ of 1.6 moles $Na_2O$, 4.0 moles $SiO_2$ and 36 moles of $H_2O$. The mixture was digested at 100° C. in a sealed glass container for 16 hours. The supernatant liquid was separated by filtration. The solid residue, white powder, was washed until free of excess sodium hydroxide. Chemical analysis of the dried powder gave the following molar composition:

$$0.95Na_2O:Al_2O_3:3.54SiO_2:6.1H_2O$$

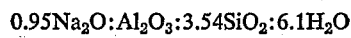

The X-ray powder diffraction pattern was substantially as shown in Table I.

The crystals of this invention are basically three-dimensional frameworks of $SiO_4$ and $AlO_4$ tetrahedra, cross-linked by the sharing of oxygen atoms. The electrovalence of each tetrahedron containing aluminum is balanced by the presence of a cation such as an alkali metal ion in accordance with Pauling's electrostatic valence rule. The spaces between the tetrahedra are occupied by water molecules.

The crystals may be dehydrated by heating in such a manner as to effect the loss of the water of hydration. Such dehydration may be effected by standard techniques such as heating under vacuum at about 350° C. or heating in a purge gas such as air. This leaves a crystal structure interlaced with channels of molecular dimensions offering very high surface area for the adsorption of foreign molecules.

Zeolite R exhibits a selectivity for polar adsorbates, with high capacity even at low relative concentrations. The pore size can be varied within limits by replacement, at least in part, of the sodium cations with smaller or larger cations. Such ion exchange may be accomplished by passing a water solution of a soluble salt of the cation to be introduced through a bed of zeolite R.

Many varieties of zeolite R may be prepared by ion exchange. A satisfactory procedure for ion exchange comprises heating the zeolite R with a water solution of a salt of the desired cation, filtering, washing, and drying the product. Continuous means may also be employed, however.

As an example of the ion-exchange technique, a cation-exchanged form of synthetic zeolite R was prepared by slurrying 1.0 g. of zeolite R with 60 cc. (0.006 M) of an aqueous solution composed of 7.4 grams of $Ca(OH)_2$ in 1000 cc. and 11.1 grams $CaCl_2$ in 1000 cc., heating to about 100° C. for 30 minutes, followed by filtering, washing and drying. Chemical analysis showed that 52% of the original sodium ions were replaced by calcium ions. By similar methods other divalent and monovalent cation exchanges may be performed; for example, aqueous solutions of soluble salts of such cations as lithium, magnesium, zinc, potassium, strontium, barium, etc. may be employed in this ion-exchange process.

Zeolite R has unique adsorption characteristics which are illustrated by the data of Table III.

TABLE III

*Adsorptive Properties of Dehydrated Synthetic Zeolite R*

| Adsorbate | Pressure, mm. Hg | Temperature, ° C. | Grams Adsorbed per 100 g. of Adsorbent |
|---|---|---|---|
| $H_2O$ | 0.1 | 25 | 17.2 |
| | 5 | 25 | 22.8 |
| | 24 | 25 | 25.9 |
| $CO_2$ | 0.3 | 25 | 2.1 |
| | 50 | 25 | 13.6 |
| | 700 | 25 | 17.6 |
| | 700 | 25 | [1] 13.9 |
| Argon | 0.1 | −196 | 0 |
| | 5 | −196 | 0 |
| | 150 | −196 | 2.8 |
| | 150 | −196 | [1] 2.3 |
| Propane | 0.5 | 25 | 0 |
| | 50 | 25 | 0 |
| | 700 | 25 | 1.2 |
| Oxygen | 700 | −183 | 16.0 |
| | 700 | −183 | [1] 4.3 |
| Nitrogen | 700 | −196 | 5.5 |
| | 700 | −196 | [1] 3.6 |
| Cyclopropane | 700 | 25 | 2.3 |

[1] 0.52 Ca-exchanged synthetic zeolite R.

As is shown by the table, the adsorptive properties of synthetic zeolite R may be altered by ion-exchange.

It is to be noted that the rejection characteristics of the molecular sieves are as important as the adsorption characteristics. This may be illustrated by the drying of propane at 25° C. Sodium zeolite R will pick up about a fourth of its own weight in water, without picking up any appreciable amount of propane. In the same way, exchanged forms of zeolite R are useful in separating mixtures of the types n-butane-isobutane. Zeolite R is also useful for drying other hydrocarbons such as isobutane or benzene.

The desorption of adsorbed materials from zeolite R may be effected by washing with water or steam, by purging with gas while holding the material at an elevated temperature, or by evacuation, or similar techniques.

Zeolite R may be used as an adsorbent in any suitable form. Powdered crystalline material gives excellent results as do pelleted forms. The pelleted forms may be obtained by pressing into pellets a mixture of zeolite R and a suitable bonding agent such as clay.

The density of a typical zeolite R composition is about 1.98 g. per cc. when fully hydrated. Zeolite R crystals prepared by the process described herein average about 4 microns in diameter.

What is claimed is:

1. A crystalline synthetic sodium aluminosilicate having a composition expressed in terms of oxides as follows:

$$0.9 \pm 0.2 Na_2O : Al_2O_3 : 3.45\text{--}3.65 SiO_2 : XH_2O$$

wherein "X," in the fully hydrated form, is about 7, said crystalline silicate being arranged in a unit cell in such a manner that the X-ray powder diffraction pattern of the material is substantially the same as shown in the following table:

SODIUM ZEOLITE R

| d, A. | 100 (I/I max.) |
|---|---|
| 9.51 | 88 |
| 6.97 | 35 |
| 5.75 | 16 |
| 5.61 | 26 |
| 5.10 | 45 |
| 4.75 | 12 |
| 4.37 | 78 |
| 4.13 | 12 |
| 4.02 | 14 |
| 3.92 | 35 |
| 3.80 | 16 |
| 3.63 | 41 |
| 3.48 | 25 |
| 3.34 | 12 |
| 3.21 | 18 |
| 3.13 | 12 |
| 2.95 | 100 |
| 2.89 | 16 |
| 2.80 | 14 |
| 2.71 | 14 |
| 2.66 | 10 |
| 2.62 | 25 |
| 2.53 | 22 |
| 2.39 | 10 |
| 2.14 | 6 |
| 2.10 | 14 |
| 1.93 | 10 |
| 1.89 | 10 |
| 1.82 | 18 |
| 1.76 | 6 |
| 1.73 | 16 |
| 1.69 | 4 |

2. The monovalent and divalent cation derivatives of the crystalline synthetic sodium aluminosilicate which has the composition expressed in terms of oxides as follows:

$$0.9 \pm 0.2 Na_2O : Al_2O_3 : 3.45\text{--}3.65 SiO_2 : XH_2O$$

wherein "X," in the fully hydrated form is about 7, said crystalline silicate being arranged in a unit cell in such a manner that the X-ray powder diffraction pattern of the material is substantially the same as shown in the following table:

SODIUM ZEOLITE R

| d, A. | 100 (I/I max.) |
|---|---|
| 9.51 | 88 |
| 6.97 | 35 |
| 5.75 | 16 |
| 5.61 | 26 |
| 5.10 | 45 |
| 4.75 | 12 |
| 4.37 | 78 |
| 4.13 | 12 |
| 4.02 | 14 |
| 3.92 | 35 |
| 3.80 | 16 |
| 3.63 | 41 |
| 3.48 | 25 |
| 3.34 | 12 |
| 3.21 | 18 |
| 3.13 | 12 |
| 2.95 | 100 |
| 2.89 | 16 |
| 2.80 | 14 |
| 2.71 | 14 |
| 2.66 | 10 |
| 2.62 | 25 |
| 2.53 | 22 |
| 2.39 | 10 |
| 2.14 | 6 |
| 2.10 | 14 |
| 1.93 | 10 |
| 1.89 | 10 |
| 1.82 | 18 |
| 1.76 | 6 |
| 1.73 | 16 |
| 1.69 | 4 |

3. The calcium derivative of the crystalline synthetic sodium aluminosilicate which has the composition expressed in terms of oxides as follows:

$$0.9 \pm 0.2 Na_2O : Al_2O_3 : 3.45\text{--}3.65 SiO_2 : XH_2O$$

wherein "X," in the fully hydrated form is about 7, said crystalline silicate being arranged in a unit cell in such a manner that the X-ray powder diffraction pattern of the material is substantially the same as shown in the following table:

SODIUM ZEOLITE R

| d, A. | 100 (I/I max.) |
|---|---|
| 9.51 | 88 |
| 6.97 | 35 |
| 5.75 | 16 |
| 5.61 | 26 |
| 5.10 | 45 |
| 4.75 | 12 |
| 4.37 | 78 |
| 4.13 | 12 |
| 4.02 | 14 |
| 3.92 | 35 |
| 3.80 | 16 |
| 3.63 | 41 |
| 3.48 | 25 |
| 3.34 | 12 |
| 3.21 | 18 |
| 3.13 | 12 |
| 2.95 | 100 |
| 2.89 | 16 |
| 2.80 | 14 |
| 2.71 | 14 |
| 2.66 | 10 |
| 2.62 | 25 |
| 2.53 | 22 |
| 2.39 | 10 |
| 2.14 | 6 |
| 2.10 | 14 |
| 1.93 | 10 |
| 1.89 | 10 |
| 1.82 | 18 |
| 1.76 | 6 |
| 1.73 | 16 |
| 1.69 | 4 |

4. A method of preparing a crystalline synthetic sodium aluminosilicate having a composition expressed in terms of oxides as follows:

$$0.9 \pm 0.2 Na_2O : Al_2O_3 : 3.45\text{--}3.65 SiO_2 : XH_2O$$

wherein "X" in the fully hydrated form is about 7, said crystalline silicate being arranged in a unit cell in such a manner that the X-ray diffraction pattern of the material is substantially the same as shown in the following table:

SODIUM ZEOLITE R

| d, A. | 100 (I/I max.) |
|---|---|
| 9.51 | 88 |
| 6.97 | 35 |
| 5.75 | 16 |
| 5.61 | 26 |
| 5.10 | 45 |
| 4.75 | 12 |
| 4.37 | 78 |
| 4.13 | 12 |
| 4.02 | 14 |
| 3.92 | 35 |
| 3.80 | 16 |
| 3.63 | 41 |
| 3.48 | 25 |
| 3.34 | 12 |
| 3.21 | 18 |
| 3.13 | 12 |
| 2.95 | 100 |
| 2.89 | 16 |
| 2.80 | 14 |
| 2.71 | 14 |
| 2.66 | 10 |
| 2.62 | 25 |
| 2.53 | 22 |
| 2.39 | 10 |
| 2.14 | 6 |
| 2.10 | 14 |
| 1.93 | 10 |
| 1.89 | 10 |
| 1.82 | 18 |
| 1.76 | 6 |
| 1.73 | 16 |
| 1.69 | 4 | which method comprises preparing a sodium aluminosilicate-water mixture having a composition in terms of oxide mole-ratios within the following range:

$Na_2O/SiO_2$ ---------------------------- 0.20 to 0.40
$SiO_2/Al_2O_3$ -------------------------- About 4
$H_2O/Na_2O$ ---------------------------- 22 to 60 maintaining the mixture at a temperature within the range of from about 25° C. to about 150° C. until crystals form; and separating the crystals from the mother liquor.

5. A method of preparing a crystalline synthetic sodium aluminosilicate having a composition expressed in terms of oxides as follows:

$$0.9 \pm 0.2 Na_2O : Al_2O_3 : 3.45-3.65 SiO_2 : XH_2O$$

wherein "X" in the fully hydrated form is about 7, said crystalline silicate being arranged in a unit cell in such a manner that the X-ray diffraction pattern of the material is substantially the same as shown in the following table:

SODIUM ZEOLITE R

| d, A. | 100 (I/I max.) |
|---|---|
| 9.51 | 88 |
| 6.97 | 35 |
| 5.75 | 16 |
| 5.61 | 26 |
| 5.10 | 45 |
| 4.75 | 12 |
| 4.37 | 78 |
| 4.13 | 12 |
| 4.02 | 14 |
| 3.92 | 35 |
| 3.80 | 16 |
| 3.63 | 41 |
| 3.48 | 25 |
| 3.34 | 12 |
| 3.21 | 18 |
| 3.13 | 12 |
| 2.95 | 100 |
| 2.89 | 16 |
| 2.80 | 14 |
| 2.71 | 14 |
| 2.66 | 10 |
| 2.62 | 25 |
| 2.53 | 22 |
| 2.39 | 10 |
| 2.14 | 6 |
| 2.10 | 14 |
| 1.93 | 10 |
| 1.89 | 10 |
| 1.82 | 18 |
| 1.76 | 6 |
| 1.73 | 16 |
| 1.69 | 4 | which method comprises preparing a sodium aluminosilicate-water mixture having a composition in terms of oxide mole-ratios within the following range:

$Na_2O/SiO_2$ ---------------------------- 0.41 to 0.60
$SiO_2/Al_2O_3$ -------------------------- 3.5 to 6.0
$H_2O/Na_2O$ ---------------------------- 30 to 60 maintaining the mixture at a temperature within the range of from about 25° C. to about 150° C. until crystals form; and separating the crystals from the mother liquor.

6. A method of preparing a crystalline synthetic sodium aluminosilicate having a composition expressed in terms of oxides as follows:

$$0.9 \pm 0.2 Na_2O : Al_2O_3 : 3.45-3.65 SiO_2 : XH_2O$$

wherein "X" in the fully hydrated form is about 7, said crystalline silicate being arranged in a unit cell in such a manner that the X-ray diffraction pattern of the material is substantially the same as shown in the following table:

SODIUM ZEOLITE R

| d, A. | 100 (I/I max.) |
|---|---|
| 9.51 | 88 |
| 6.97 | 35 |
| 5.75 | 16 |
| 5.61 | 26 |
| 5.10 | 45 |
| 4.75 | 12 |
| 4.37 | 78 |
| 4.13 | 12 |
| 4.02 | 14 |
| 3.92 | 35 |
| 3.80 | 16 |
| 3.63 | 41 |
| 3.48 | 25 |
| 3.34 | 12 |
| 3.21 | 18 |
| 3.13 | 12 |
| 2.95 | 100 |
| 2.89 | 16 |
| 2.80 | 14 |
| 2.71 | 14 |
| 2.66 | 10 |
| 2.62 | 25 |
| 2.53 | 22 |
| 2.39 | 10 |
| 2.14 | 6 |
| 2.10 | 14 |
| 1.93 | 10 |
| 1.89 | 10 |
| 1.82 | 18 |
| 1.76 | 6 |
| 1.73 | 16 |
| 1.69 | 4 | which method comprises preparing a sodium aluminosilicate-water mixture having a composition in terms of oxide mole-ratios within the following range:

$Na_2O/SiO_2$ ---------------------------- 0.61 to 0.80
$SiO_2/Al_2O_3$ -------------------------- 3.5 to 6.5
$H_2O/Na_2O$ ---------------------------- 40 to 80 maintaining the mixture at a temperature within the range of from about 25° C. to about 150° C. until crystals form; and separating the crystals from the mother liquor.

7. A method of preparing a crystalling synthetic sodium aluminosilicate having a composition expressed in terms of oxides as follows:

$$0.9 \pm 0.2 Na_2O : Al_2O_3 : 3.45-3.65 SiO_2 : XH_2O$$

wherein "X" in the fully hydrated form is about 7, said crystalline silicate being arranged in a unit cell in such a manner that the X-ray diffraction pattern of the material is substantially the same as shown in the following table:

SODIUM ZEOLITE R

| d, A. | 100 (I/I max.) |
|---|---|
| 9.51 | 88 |
| 6.97 | 35 |
| 5.75 | 16 |
| 5.61 | 26 |
| 5.10 | 45 |
| 4.75 | 12 |
| 4.37 | 78 |
| 4.13 | 12 |
| 4.02 | 14 |
| 3.92 | 35 |
| 3.80 | 16 |
| 3.63 | 41 |
| 3.48 | 25 |
| 3.34 | 12 |
| 3.21 | 18 |
| 3.13 | 12 |
| 2.95 | 100 |
| 2.89 | 16 |
| 2.80 | 14 |
| 2.71 | 14 |
| 2.66 | 10 |
| 2.62 | 25 |
| 2.53 | 22 |
| 2.39 | 10 |
| 2.14 | 6 |
| 2.10 | 14 |
| 1.93 | 10 |
| 1.89 | 10 |
| 1.82 | 18 |
| 1.76 | 6 |
| 1.73 | 16 |
| 1.69 | 4 | which method comprises preparing a sodium aluminosilicate-water mixture having a composition in terms of oxide mole-ratios within the following range:

$Na_2O/SiO_2$ _____ 0.81 to 1.0
$SiO_2/Al_2O_3$ _____ 3 to 4.5
$H_2O/Na_2O$ _____ 40 to 80 maintaining the mixture at a temperature within the range of from about 25° C. to about 150° C. until crystals form; and separating the crystals from the mother liquor.

8. A method of preparing a crystalline synthetic sodium aluminosilicate having a composition expressed in terms of oxides as follows:

$$0.9 \pm 0.2 Na_2O : Al_2O_3 : 3.45\text{--}3.65 SiO_2 : XH_2O$$

wherein "X" in the fully hydrated form is about 7, said crystalline silicate being arranged in a unit cell in such a manner that the X-ray diffraction pattern of the material is substantially the same as shown in the following table:

SODIUM ZEOLITE R

| d, A. | 100 (I/I max.) |
|---|---|
| 9.51 | 88 |
| 6.97 | 35 |
| 5.75 | 16 |
| 5.61 | 26 |
| 5.10 | 45 |
| 4.75 | 12 |
| 4.37 | 78 |
| 4.13 | 12 |
| 4.02 | 14 |
| 3.92 | 35 |
| 3.80 | 16 |
| 3.63 | 41 |
| 3.48 | 25 |
| 3.34 | 12 |
| 3.21 | 18 |
| 3.13 | 12 |
| 2.95 | 100 |
| 2.89 | 16 |
| 2.80 | 14 |
| 2.71 | 14 |
| 2.66 | 10 |
| 2.62 | 25 |
| 2.53 | 22 |
| 2.39 | 10 |
| 2.14 | 6 |
| 2.10 | 14 |
| 1.93 | 10 |
| 1.89 | 10 |
| 1.82 | 18 |
| 1.76 | 6 |
| 1.73 | 16 |
| 1.69 | 4 | which method comprises preparing a sodium aluminosilicate-water mixture having a composition in terms of oxide mole-ratios within the following range:

$Na_2O/SiO_2$ _____ 0.81 to 1.0
$SiO_2/Al_2O_3$ _____ About 30
$H_2O/Na_2O$ _____ 50 to 60 maintaining the mixture at a temperature within the range of from about 25° C. to about 150° C. until crystals form; and separating the crystals from the mother liquor.

9. A method of preparing a crystalline synthetic sodium aluminosilicate having a composition expressed in terms of oxides as follows:

$$0.9 \pm 0.2 Na_2O : Al_2O_3 : 3.45\text{--}3.65 SiO_2 : XH_2O$$

wherein "X" in the fully hydrated form is about 7, said crystalline silicate being arranged in a unit cell in such a manner that the X-ray diffraction pattern of the material is substantially the same as shown in the following table:

SODIUM ZEOLITE R

| d, A. | 100 (I/I max.) |
|---|---|
| 9.51 | 88 |
| 6.97 | 35 |
| 5.75 | 16 |
| 5.61 | 26 |
| 5.10 | 45 |
| 4.75 | 12 |
| 4.37 | 78 |
| 4.13 | 12 |
| 4.02 | 14 |
| 3.92 | 35 |
| 3.80 | 16 |
| 3.63 | 41 |
| 3.48 | 25 |
| 3.34 | 12 |
| 3.21 | 18 |
| 3.13 | 12 |
| 2.95 | 100 |
| 2.89 | 16 |
| 2.80 | 14 |
| 2.71 | 14 |
| 2.66 | 10 |
| 2.62 | 25 |
| 2.53 | 22 |
| 2.39 | 10 |
| 2.14 | 6 |
| 2.10 | 14 |
| 1.93 | 10 |
| 1.89 | 10 |
| 1.82 | 18 |
| 1.76 | 6 |
| 1.73 | 16 |
| 1.69 | 4 | which method comprises preparing a sodium aluminosilicate-water mixture having a composition in terms of oxide mole-ratios within the following ranges:

$Na_2O/SiO_2$ _____ 1.7 to 1.9
$SiO_2/Al_2O_3$ _____ 10 to 25
$H_2O/Na_2O$ _____ 60 to 70 maintaining the mixture at a temperature within the range of from about 25° C. to about 150° C. until crystals form; and separating the crystals from the mother liquor.

10. A method of preparing a crystalline synthetic sodium aluminosilicate having a composition expressed in terms of oxides as follows:

$$0.9 \pm 0.2 Na_2O : Al_2O_3 : 3.45\text{--}3.65 SiO_2 : XH_2O$$

wherein "X" in the fully hydrated form is about 7, said crystalline silicate being arranged in a unit cell in such a manner that the X-ray diffraction pattern of the material is substantially the same as shown in the following table:

SODIUM ZEOLITE R

| d, A. | 100 (I/I max.) |
|---|---|
| 9.51 | 88 |
| 6.97 | 35 |
| 5.75 | 16 |
| 5.61 | 26 |
| 5.10 | 45 |
| 4.75 | 12 |
| 4.37 | 78 |
| 4.13 | 12 |
| 4.02 | 14 |
| 3.92 | 35 |
| 3.80 | 16 |
| 3.63 | 41 |
| 3.48 | 25 |
| 3.34 | 12 |
| 3.21 | 18 |
| 3.13 | 12 |
| 2.95 | 100 |
| 2.89 | 16 |
| 2.80 | 14 |
| 2.71 | 14 |
| 2.66 | 10 |
| 2.62 | 25 |
| 2.53 | 22 |
| 2.39 | 10 |
| 2.14 | 6 |
| 2.10 | 14 |
| 1.93 | 10 |
| 1.89 | 10 |
| 1.82 | 18 |
| 1.76 | 6 |
| 1.73 | 16 |
| 1.69 | 4 | which method comprises preparing a sodium aluminosilicate-water mixture having a composition in terms of oxide mole-ratios within the following range:

$Na_2O/SiO_2$ ---------------------------------- 1.2 to 1.4
$SiO_2/Al_2O_3$ ---------------------------------- About 6
$H_2O/Na_2O$ ---------------------------------- 80 to 90 maintaining the mixture at a temperature within the range of from about 25° C. to about 150° C. until crystals form; and separating the crystals from the mother liquor 11. A method in accordance with claim 4 wherein at least a substantial portion of the siliceous material is obtained from an aqueous colloidal silica sol.

12. A method in accordance with claim 5 wherein at least a substantial portion of the siliceous material is obtained from an aqueous colloidal silica sol.

13. A method in accordance with claim 6 wherein at least a substantial portion of the siliceous materia lis obtained from an aqueous colloidal silica sol.

14. A method in accordance with claim 7 wherein at least a substantial portion of the siliceous material is obtained from an aqueous colloidal silica sol.

15. A method in accordance with claim 8 wherein at least a substantial portion of the siliceous material is obtained from an aqueous colloidal silica sol.

16. A method in accordance with claim 9 wherein at least a substantial portion of the siliceous material is obtained from an aqueous colloidal silica sol.

17. A method in accordance with claim 10 wherein at least a substantial portion of the siliceous material is obtained from an aqueous colloidal silica sol.

18. A dehydrated crystalline synthetic sodium aluminosilicate having a composition expressed in terms of oxides as follows:

$$0.9 \pm 0.2 Na_2O : Al_2O_3 : 3.45-3.65 SiO_2$$

said crystalline silicate being arranged in a unit cell in such a manner that the X-ray powder diffraction pattern of the material is substantially the same as that shown in the following table:

SODIUM ZEOLITE R

| d, A. | 100 (I/I max.) |
|---|---|
| 9.51 | 88 |
| 6.97 | 35 |
| 5.75 | 16 |
| 5.61 | 26 |
| 5.10 | 45 |
| 4.75 | 12 |
| 4.37 | 78 |
| 4.13 | 12 |
| 4.02 | 14 |
| 3.92 | 35 |
| 3.80 | 16 |
| 3.63 | 41 |
| 3.48 | 25 |
| 3.34 | 12 |
| 3.21 | 18 |
| 3.13 | 12 |
| 2.95 | 100 |
| 2.89 | 16 |
| 2.80 | 14 |
| 2.71 | 14 |
| 2.66 | 10 |
| 2.62 | 25 |
| 2.53 | 22 |
| 2.39 | 10 |
| 2.14 | 6 |
| 2.10 | 14 |
| 1.93 | 10 |
| 1.89 | 10 |
| 1.82 | 18 |
| 1.76 | 6 |
| 1.73 | 16 |
| 1.69 | 4 |

References Cited in the file of this patent
UNITED STATES PATENTS

| 1,990,751 | Ralston et al. | Feb. 12, 1935 |
| 2,841,471 | Sensel | July 1, 1958 |

FOREIGN PATENTS

| 777,233 | Great Britain | June 19, 1957 |

OTHER REFERENCES

Barrer et al.: "J. Chem. Soc.," Part 3, pp. 2882–2903, 1956.
Barrer et al.: "J. Chem. Soc.," pp. 1561–71, 1952.